Feb. 21, 1956     W. D. McLEAN     2,735,471
SUPPLEMENTAL SHOE FOR AUTOMOBILE TIRES
Filed Jan. 25, 1954
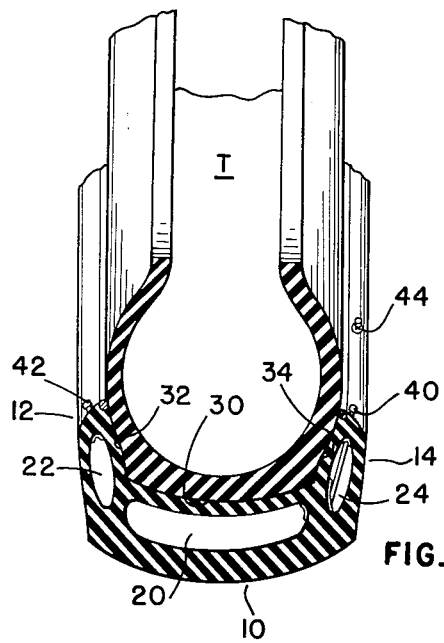
FIG__2
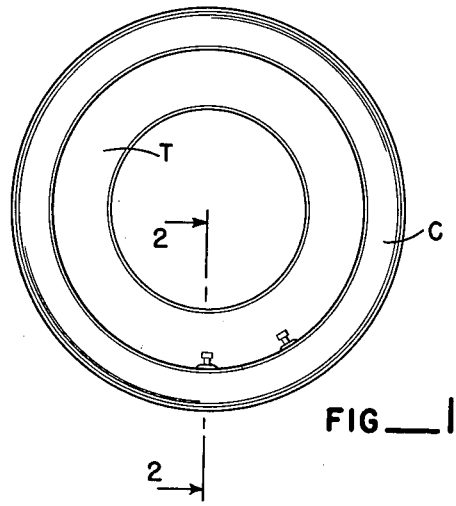
FIG__1
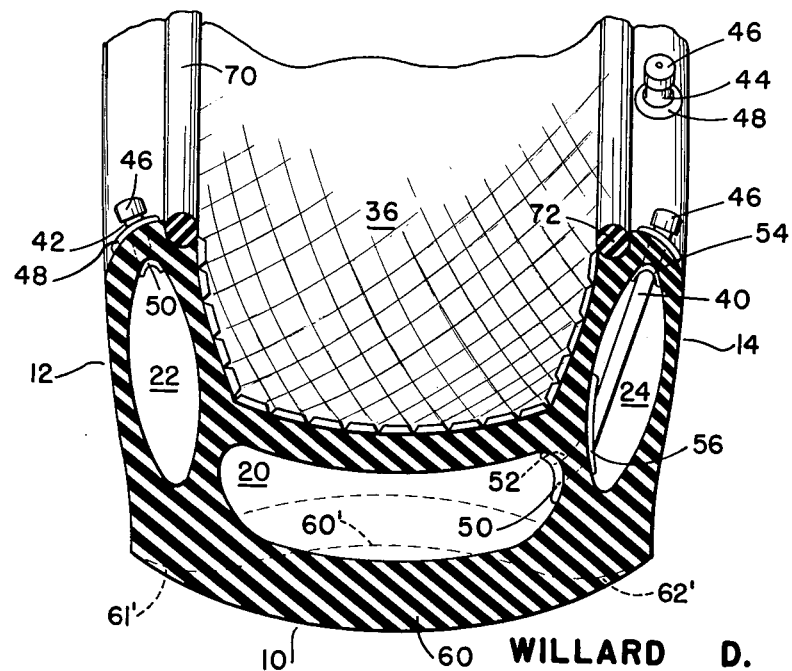
FIG__3
WILLARD D. MC LEAN
INVENTOR.
BY *Smith & Tuck*

United States Patent Office 2,735,471
Patented Feb. 21, 1956

2,735,471

SUPPLEMENTAL SHOE FOR AUTOMOBILE TIRES

Willard D. McLean, Snohomish, Wash.

Application January 25, 1954, Serial No. 405,831

1 Claim. (Cl. 152—187)

My invention relates to automobile tires, and, more particularly, to a supplemental shoe for automobile tires. Briefly, the supplemental shoe comprises a removable annular casing, adapted to slip over a tire, and having separate air compartments abutting the tread and each side wall of the tire, securely gripping the same when inflated. The outer surface of the casing provides a tread and the inner surface is corrugated to better grip the tire. It will be understood that the tread on the casing may be particularly adapted for use in snow, ice, etc.

In most climatic regions there are times when the conventional automobile tires need to be supplemented for more secure traction in ice, snow, mud, or the like. The supplemental or substitute tread for such occasions has generally taken two forms. One device is that of the tire chain and the other is the use of a full substitute tire, such as the sawdust tire. There is a common problem with these devices of applying the device to the car and perhaps the most difficult is the substitute tire, especially if the car owner does not have extra car wheels for the extra tires. For many types of driving, however, the substitute tire is the best solution because of the limit on speed and the unpleasant noise associated with tire chains. For the worst of traction conditions, the chains may operate most satisfactorily; but, for long periods of driving, a special tread on the tire is the most satisfactory resource.

An object of my invention is, therefore, to provide a supplementary tire shoe which has the advantages of a substitute tire but may be applied to the automobile at least as easily as tire chains. Other objects include: providing a supplemental casing which will securely grip a primary tire so as to have the characteristics of a unitary structure, to devise an inflatable shoe to form a supplemental tread over a tire which includes means for changing the contour of the supplemental tread to other than the usual contour; and to adapt a supplemental casing for application to a tire by using a plurality of annular air compartments.

My invention will best be understood, together with further objectives and advantages thereof, from a reading of the following description, when read with reference to the drawings, in which:

Figure 1 is a face view of a specific embodiment of my substitute tire tread as applied on a tire;

Figure 2 is an enlarged view taken on line 2—2 of Figure 1, in fragmentary form and partly in section; and Figure 3 is a view of the supplemental casing taken in the same sense as Figure 2 on considerably enlarged scale and with the tire removed.

The drawings show an ordinary automobile tire T and a supplemental casing C. This structure in effect can provide a change of tread on the tire. Several uses can be made of a device of this kind as will be apparent. One example is the applying to the tire T the equivalent of a sawdust tread, and another example is the application of a tread with rather massive grooves, such as are used on tractor tires. It has been suggested that this forms a new device for recapping tires; but the principal use of the device is as a substitute for chains or extra tires.

The casing C is formed with an annular tread portion 10 and inwardly extending sidewalls 12 and 14, together forming in transverse cross section substantially a U-shaped contour inwardly faced. Tread portion 10 has a separate annular inflatable air compartment 20 and sidewalls 12 and 14 have separate air compartments 22 and 24 respectively. Compartment 20 in transverse cross section is elongated transversely and compartments 22 and 24 in transverse cross section are elongated radially of the tire.

When inflated, compartments 20, 22, 24 force the inner surface of the casing to press against tread 30 and sidewalls 32, 34 respectively of tire T. As shown in Figure 3, it is preferred that the abutting surfaces, as 36, are in some way deformed for better gripping, such as by corrugations, pebbles, or other embossing.

Valves 40, 42, and 44 are provided of the type common to automobile tires for the compartments 20, 22, and 24 respectively. These valves have caps 46, and inner and outer flanges 48, 50, and are of conventional construction, except for having longer stems. In the case of valve 40, the stem extends from the rim of the casing through compartment 24 to compartment 20 and has a bend at 52. Valve 40 may also have some supplemental sealing flanges as 54, 56 for its course through compartment 24.

Compartments 20, 22, 24 may be formed in different ways according to the type of tread 60 that may be desired or the type of use contemplated. The structure shown in the drawings is formed of the combination rubber and fabric usually used in tires of high enough grade material that compartments 20, 22, and 24 can be formed directly from this material and used without an inner tube. The inside of the compartments can be coated with air impervious material or have inner tubes in them, if that is preferred. If the tread portion 60 of the casing is of sawdust or comparable composition, then some such extra sealing in the compartment may be desirable.

A round reinforcing band as 70, 72, is formed on the innermost edge of sidewall portions 12 and 14. Casing C is slipped on tire T, in the manner of the application of any tire to a rim, and of course, at this time the casing is not inflated. The inner reinforcing rim 70 facilitates the sliding of the casing over the tire and the casing can have considerable tolerance in size relative the tire so that this application is quite easy. When installed on an automobile, valves 40, 44 will be on the outside of the tire and valve 42 on the inside, but all of the valves can be reached by the filling station or garage attendant. When inflated, the compartment may exert various amounts of pressure on tire T, basically in three directions. By having separate compartments it is possible to grip the tire more securely than with a single compartment.

A further important reason for having a series of compartments is that in this way different air pressures can be used in the compartments 22, 24, than is used in compartment 20. By these means, a result can be obtained such as is shown in Figure 3. In dotted lines 60' illustrates the position of the ground engaging surface 60 of tread portion 10, when compartment 20 has a much lower pressure than compartments 22, 24. It will be observed that the edge portions 61' and 62' are the bearing portions of the tire and the dual ridges formed on each tire will be understood to have a guiding tendency in slippery conditions such as mud. This is not found in the conventional tire which presents a convex surface providing little resistance to sideway slipping of the automobile.

Having thus described my invention, I do not wish to

I claim:

A supplemental externally applicable shoe for automobile tires, comprising: an annular casing, essentially U-shaped in transverse section, provided with a tread portion to cover the tread of a tire and having inwardly extending sidewall portions covering part of the sidewalls of such tire; said casing having an annular inflatable air compartment formed in said tread portion and a separate annular air compartment in each sidewall portion; an independent air valve connected to each compartment; said compartments each having in transverse cross-section an oblong outline, elongated transversely in said tread portion and elongated radially in said sidewall portions; the compartments in the sidewall portions partially lapping the compartment in said tread portion and extending inwardly therefrom; said tread portion having an exterior ground engaging surface; and said compartments in said sidewall portions being inflatable to a substantially higher air pressure than the compartment in said tread portion whereby said ground engaging surface may be concavely depressed in its center upon ground engaging contact.

References Cited in the file of this patent
UNITED STATES PATENTS

| | | |
|---|---|---|
| 1,989,402 | Cupp | Jan. 29, 1935 |
| 2,217,122 | Lowry | Oct. 8, 1940 |
| 2,365,279 | Kraft | Dec. 19, 1944 |